United States Patent

[11] 3,564,213

| [72] | Inventors | Siegfried Spauszus<br>Villingen;<br>Josef Krickl, Bad Duerrheim, Germany |
|---|---|---|
| [21] | Appl. No. | 757,921 |
| [22] | Filed | Sept. 6, 1968 |
| [45] | Patented | Feb. 16, 1971 |
| [73] | Assignee | Kienzle Apparate G.m.b.H.<br>Villingen, Black Forest, Germany |
| [32] | Priority | Sept. 14, 1967 |
| [33] | | Germany |
| [31] | | 1,549,794 |

[54] ARRANGEMENT FOR REDUCING ERRORS IN COUNTING LINE SEGMENTS OF A ZIGZAG LINE DIAGRAM
6 Claims, 3 Drawing Figs.

[52] U.S. Cl. .................................................. 235/61.11, 356/71
[51] Int. Cl. .................................................. G06k 7/10, G06k 9/08

[50] Field of Search ............................................ 235/61.11, 61.115, 61.6A; 340/146.3; 250/(Inquired), 202, 219 (IA); 356/71; 324/78

[56] References Cited
UNITED STATES PATENTS
3,482,210  12/1969  Lozier et al. ..................  340/146.3

*Primary Examiner*—Maynard R. Wilbur
*Assistant Examiner*—Thomas J. Sloyan
*Attorney*—Michael S. Striker ABSTRACT: To reduce errors due to surface imperfections of a zigzag line diagram, the line diagram is scanned along two parallel paths parallel to the center line of the diagram and on opposite sides thereof. The scanning means therefore alternately generate pulse pairs. Logic circuits select the second one of each pair as a counting signal. The selection takes place only if a pulse generated by the other scanning means and a pulse by the scanning means from which the counting pulse is to be selected precede the counting pulse. The so-selected counting pulses are counted and the results stored.

PATENTED FEB 16 1971  3,564,213

Inventors
Siegfried Spauszus
Josef Krickl

ARRANGEMENT FOR REDUCING ERRORS IN COUNTING LINE SEGMENTS OF A ZIGZAG LINE DIAGRAM

BACKGROUND OF THE INVENTION

This invention relates to an arrangement and method for generating a magnitude signal corresponding to the magnitude of a measured quantity by means of a zigzag line diagram having a plurality of line segments, consecutive ones of said line segments being joined at points of reversal, the distance between consecutive points of reversal corresponding to a predetermined unit value of said measured quantity.

This type of line diagram is frequently used to indicate the magnitude of a measured quantity as for example the number of units manufactured, the amount of electricity of fluid generated or consumed, or distance covered, for example, during predetermined time periods. This type of quantized diagram is particularly advantageous first, because the writing utensil is in continuous contact with the surface on which the recording is made, thus resulting in relatively simple equipment and, secondly, because proper choice of the unit of measurement represented by the distance between consecutive reversal points results in relatively simple determination of the total magnitude of the measured quantity by a counting of the reversal points or line segments.

It is of course desirable to effect the counting of the line segments of reversal points automatically. This is particularly desirable when other data, as for example, working hours and lunch hours, is also recorded on the same disc and is automatically evaluated. In the simplest case it would seem possible merely to count the intersections of a scanning path with each of the line segments.

However, some difficulties arise for such an automatic readout system which do not enter into a visual evaluation of these line diagrams. For example, the reference line, which is recorded on the diagram in the direction of movement of said diagram in the absence of the measured quantity, may be found anywhere within the limits defined by the reversal points. Further, the linearity of the reference line in a relatively inexpensive instrument and under rough operating conditions will vary with wide tolerances. Therefore, it can happen that the scanning path intersects such a reference line in a number of places. Further, it is possible that the recording disc itself, due to rough handling, may have fingerprints or scratches which result in erroneous read pulses being generated by the scanning means which of course cause errors in the magnitude of the measured quantity determined by the automatic scanning of the line diagram.

SUMMARY OF THE INVENTION

This invention comprises an arrangement for generating a magnitude signal corresponding to the magnitude of a measured quantity by use of a zigzag line diagram, whereby the errors mentioned above are substantially eliminated. The arrangement comprises a zigzag line diagram having a plurality of line segments, consecutive line segments being joined at points of reversal, the distance between two consecutive points of reversal corresponding to a predetermined unit value of said measured quantity. It further comprises first and second scanning means for scanning said zigzag line diagram along two substantially parallel paths, each of said paths intersecting each of said line segments, said first scanning means generating first channel read signals, said second scanning means generating second channel read signals, upon intersecting. Further comprised are first and second logic means, respectively connected to said first and second scanning means and mutually interconnected. It is the function of these logic means to receive the corresponding read signals and to select counting signals therefrom. Counting means are provided for counting the counting signals. Because of the interconnection of the logic means, surface imperfections of the diagram not affecting both scanning paths do not cause counting signals to be generated and thus do not effect erroneous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

The preferred embodiment of the present invention will now be discussed in relation to the FIGS.

Figure 1:
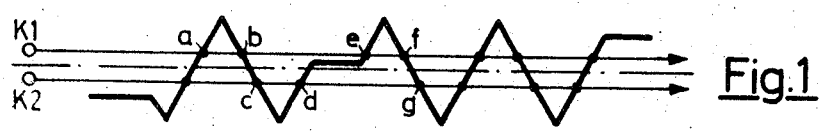
FIG. 1 shows a zigzag line diagram and two scanning paths.
Figure 2:
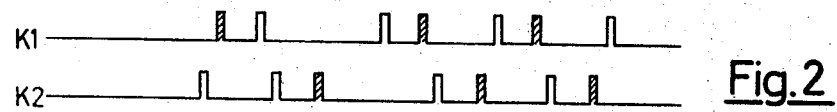
FIG. 2 shows the read pulses generated by scanning means scanning along the paths indicated in FIG. 1.

The scanning means used in this invention are conventional scanning means consisting for example of an opaque filter having two holes which two holes are positioned on opposite sides of a hypothetical center line of the zigzag diagram indicated by the alternately dashed and dotted line in FIG. 1. Relative motion of the diagram and the scanning means then causes the two holes to follow along the path denoted by K1 and K2 in FIG. 1. The light falling through each of the holes may then be applied to respective photomultiplier tubes which in turn generate the respective read signals or read pulses shown on lines K1 and K2 of FIG. 2. It will be noted that the read pulses along line K1 of FIG. 2, namely the first channel read pulses, are generated each time the first scanning path denoted by K1 in FIG. 1 intersects a line segment of the zigzag line diagram as for example at the points denoted by $a$, $b$, $e$ and $f$. The second channel read pulses, those shown along line K2 in FIG. 2, are generated when the second scanning path, denoted K2 in FIG. 1, intersects the line segments as for example at points $c$, $d$ and 2.

Figure 3:
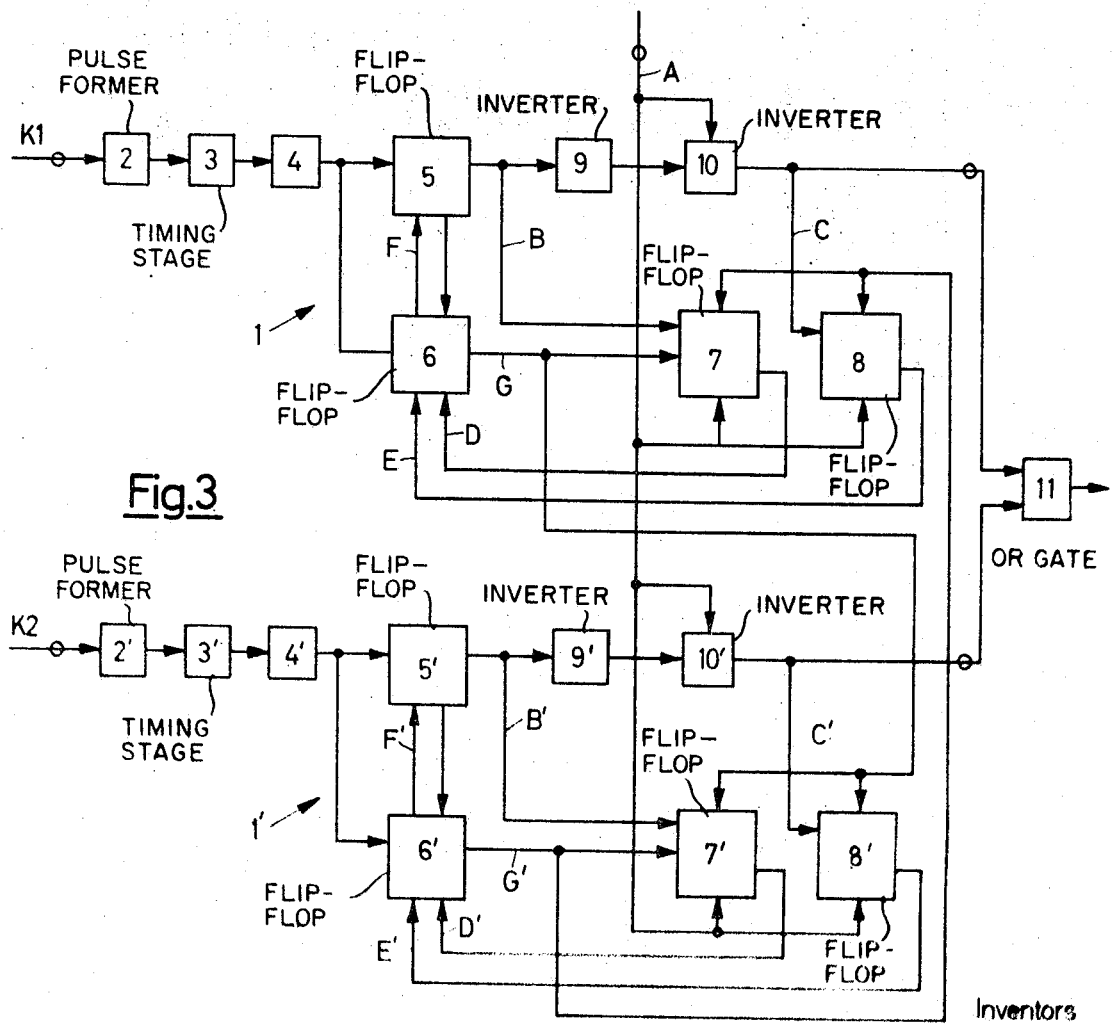
FIG. 3 shows the logic means for selecting the counting pulses from said read pulses.

Logic means, denoted by 1 and 1' in FIG. 3 are connected to the first and second scanning means respectively as denoted by the K1 and K2 at the input to logic means 1 and 1' respectively. To simplify the explanation, logic means 1 will be described in detail. The operation of logic means 1' is identical, each stage of the logic means denoted by a prime corresponding exactly to the correspondingly numbered stage in the other logic means. Input stages 2 and 3 comprise a pulse forming and timing stage respectively, while input stage 4 comprises an inverter stage. Stages 5, 6, 7 and 8 constitute flip-flop stages, while stages 9 and 10 are inverter stages. The outputs of both logic means are connected to an OR gate 11 whose output is fed to a counter, or counting and storing means which are not shown. Flip-flop 5 constitutes transmission means, flip-flops 6, 7 and 8 and their interconnections constitute blocking means, while the wiring connections extending from point A to stages 10, 7, 8 constitute initial setting means.

At the beginning of each scanning operation, a short positive signal is applied via line A to set the flip-flops 7, 8, 7', 8' to predetermined initial conditions. During the application of this signal, no read pulses can pass through logic means 1 or 1'.

Let it now be assumed that the positive signal at line A has terminated prior to the time period indicated by $a$ in FIG. 1. The read pulse appearing at time $a$, after pulse forming in stages 2 and 3, is transmitted through transmission means, or flip-flop stage 5, and thus constitutes the first counting signal or counting pulse. Furthermore, this read pulse is applied over lines B and C to the primary and secondary blocking means, namely flip-flop stages 8 and 7, respectively. Both of these stages are thus switched, causing a positive potential or blocking signal, to be applied to inputs D and E of the flip-flop stage 6. In particular the positive potential at input D is referred to as the secondary blocking signal, while the positive potential at input E is referred to as the primary blocking signal. Thus, a negative potential is generated at output F of flip-flop stage 6 which biases flip-flop stage 5 in such a manner the negative trailing edge of the first counting pulse causes the flip-flop stage to be blocked to further transmission of pulses.

As shown in FIG. 2, at time period b the second read pulse is generated by the first scanning means and is applied to flip-flop stages 5 and 6 as a negative pulse after inversion by inverter stage 4. Since the flip-flop stage 5 is blocked, no counting pulses appears at its output. However, a positive pulse is generated at the output G of flip-flop stage 6. This causes a switching of flip-flop stage 7, and thus a removal of the secondary blocking signal. It is further applied to the set input of flip-flop stage 7', causing a secondary blocking signal to be generated in the channel K2. It should be noted that the positive pulse at the G outputs of flip-flop stages 6 are applied to the set inputs of flip-flop stages 7 and the reset inputs of flip-flop stages 8 of the opposite channel. To continue, the setting of flip-flop stage 7' by the positive pulse at the output of flip-flop stage 6 results in a positive potential, or blocking signal being applied at input D' of flip-flop stage 6', thus blocking flip-flop stage 5'. Further pulses generated by the scanning means of channel 1, which may for example be caused by intersection of the first scanning path with a reference line as described above may cause further positive pulses to be generated at the output G of flip-flop 6, but are otherwise ineffective both in logic means 1 and 1'.

The first read pulse, or read signal, generated by the second scanning means, that is the first second channel read pulse, is generated at time period c. Since the flip-flop stage 5' is blocked, no counting pulse is generated. However, a positive pulse appears at the output G' of flip-flop stage 6'. This causes flip-flop stage 7' to be reset, thus removing the secondary blocking signal in the second logic means. Thus a negative potential again exists at the inputs D' and E' of flip-flop stage 6' and the flip-flop stage 5' is prepared for the transmission of a counting pulse when a positive pulse appears at input F'. The positive pulse appearing at the output G' further causes a switching in both flip-flop stages 7 and 8 of logic means 1, which causes a change of potential at inputs D and E.

A second channel read pulse is generated at time period d. Since the flip-flop stage 5' is open for transmission, this pulse reaches OR gate 11 as a counting pulse. It is also applied to inputs B' and C' of flip-flop stages 7' and 8' respectively, thus again blocking the transmission through flip-flop stage 5'.

Flip-flop stage 5 is blocked for the next first channel read pulse, namely the pulse appearing at time period e. However this pulse results in a positive pulse appearing at the output of flip-flop stage 6 which switches the flip-flop stage 7. Thus a negative potential is again present at inputs D and E of flip-flop stage 6, which corresponds to an absence of blocking signals for flip-flop stage 5. The positive pulse appearing at output G of flip-flop stage 6 further causes a resetting of flip-flop stage 8', thus terminating the blocking voltage at input E' of flip-flop stage 6'. In order to cause transmission through the flip-flop stage 5', a second channel read pulse is now required for switching the flip-flop stage 7', thus removing the secondary blocking voltage for stage 5' also.

The read pulse generated at time period f, a first channel read pulse, is transmitted by flip-flop stage 5 and thus constitutes the third counting signal or counting pulse. This counting pulse is again applied to flip-flop stages 7 and 8, thus blocking flip-flop stage 5 for any further pulses appearing at the input of said flip-flop stage 5. A read pulse from the second channel is now required to remove the primary blocking signal, namely the blocking signal furnished by flip-flop stage 8, while a further first channel read pulse is required to remove the secondary blocking signal or the blocking signal generated by flip-flop stage 7.

It thus becomes obvious that with the arrangement according to this invention every second read pulse in a given channel following a counting pulse in the other channel also constitutes a counting pulse, that is, the individual line segments constituting the zigzag line diagram are counted. It will further be noted that the first read pulse on another channel terminates the secondary blocking signal on its channel and the primary blocking signal on the opposite channel. Since the transmission of a pulse to constitute a read pulse in any given channel is thus dependent on the reception of read pulses in the other channel also, surface imperfections of the diagram which affect a single channel only cannot cause a counting pulse to be generated and thus cannot cause errors in the final result.

As discussed above, in this preferred embodiment, the circuits are originally set to permit transmission of the first generated read pulse to constitute a counting pulse. This is done to prevent an error if the scanning means generating the first read pulse then fail to encounter further points of intersection. However, this method of operation may also lead to an error if the second read pulse is generated on the opposite channel and the first line segment is thus counted twice. The effects of this error are however decreased since the zigzag line diagram does not generally consist of only one line segment, since the following read pulses on both channels do not generate counting pulses and only the third read pulse following the counting pulse on the beginning channel again constitutes a counting pulse.

While the invention has been illustrated and described as embodied in an arrangement wherein particular logic means are used to generate a counting pulse in dependence on the reception of read pulses in both channels, it is not intended to be limited to the details shown, since various modifications and structural and circuit changes may be made without departing in any way from the spirit of the present invention.

We claim:

1. An arrangement for generating a magnitude signal corresponding to the magnitude of a measured quantity, comprising in combination, a zigzag line diagram having a plurality of line segments, consecutive line segments being joined at reversal points, the distance between two consecutive reversal points corresponding to a predetermined unit value of said measured quantity; at least first and second scanning means for scanning said zigzag line diagram along two substantially parallel paths, each of said paths intersecting each of said line segments, each of said scanning means generating a corresponding read signal when intersecting a line segment, said first and second scanning means thus generating first and second channel read signals respectively; first and second mutually interconnected logic means, each also connected to the corresponding scanning means for receiving the corresponding read signals and selecting counting signals therefrom; and counting means for counting said counting signals, whereby the interconnection of said logic means substantially prevents the generation of counting signals in response to stray read signals.

2. An arrangement as set forth in claim 1 wherein a hypothetical line joining the center points of each of said line segments is a straight line; wherein said two substantially parallel paths are also parallel to said hypothetical straight line; and wherein said two parallel paths are on opposite sides of said hypothetical straight line and at substantially equal distances therefrom.

3. An arrangement as set forth in claim 1 wherein said first and second logic means respectively comprise first and second transmission means for receiving the corresponding read signals and transmitting said read signals to constitute counting signals when in an unblocked state; and wherein said first and second logic means further respectively comprise first and second blocking means each interconnected with the corresponding transmission means in such a manner that a counting signal furnished by said transmission means causes the generation of a blocking signal for blocking further transmission through said transmission means.

4. An arrangement as set forth in claim 3 wherein each of said blocking means comprises primary and secondary blocking means, respectively generating primary and secondary blocking signals; and wherein said logic means are interconnected in such a manner that alternate ones of the read signals in a given channel are applied to the primary blocking means of the other channel for terminating the primary blocking signal of said channel.

5. An arrangement as set forth in claim 4 also comprising means for applying said alternate ones of the read signals of a given channel to said secondary blocking means of the same channel, for terminating said secondary blocking signal of said channel, termination of both said primary and secondary blocking signals permitting the transmission of the next following read signal of said channel through said transmission means of said channel.

6. An arrangement as set forth in claim 5 also comprising initial setting means for initially setting all of said blocking means to permit transmission of read signals through all of said transmission means.